United States Patent
Krohn et al.

(10) Patent No.: US 9,938,998 B2
(45) Date of Patent: Apr. 10, 2018

(54) SELF-CONTAINED FASTENING ASSEMBLY FOR AGRICULTURAL SYSTEM

(71) Applicant: CNH Industrial America LLC, New Holland, PA (US)

(72) Inventors: Martin L. Krohn, Degraff, MN (US); Rex L. Ruppert, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 678 days.

(21) Appl. No.: 14/481,771

(22) Filed: Sep. 9, 2014

(65) Prior Publication Data
US 2016/0068188 A1    Mar. 10, 2016

(51) Int. Cl.
| | |
|---|---|
| F16B 5/00 | (2006.01) |
| A01M 7/00 | (2006.01) |
| B62D 49/06 | (2006.01) |
| F16B 5/02 | (2006.01) |
| F16B 5/06 | (2006.01) |

(52) U.S. Cl.
CPC ............. *F16B 5/00* (2013.01); *A01M 7/0053* (2013.01); *B62D 49/065* (2013.01); *F16B 5/02* (2013.01); *F16B 5/0642* (2013.01)

(58) Field of Classification Search
CPC ............. Y10T 403/50; Y10T 403/7062; Y10T 403/7015; Y10T 403/75; Y10T 403/7067; A01M 7/0053; A01D 34/03; A01C 7/208; B62D 49/065; A01B 61/02; A01B 3/24; A01B 3/36; A01B 3/46
See application file for complete search history.

(56) References Cited

U.S. PATENT DOCUMENTS

| | | |
|---|---|---|
| 3,845,577 A | 11/1974 | Naymik |
| 6,238,004 B1 | 5/2001 | Hansen et al. |
| 6,499,934 B1 | 12/2002 | Kaczmarski et al. |
| 6,619,906 B2 | 9/2003 | Dick |
| 6,866,467 B2 | 3/2005 | Dvorak et al. |

(Continued)

*Primary Examiner* — Daniel J Wiley
(74) *Attorney, Agent, or Firm* — Rebecca L. Henkel; Rickard K. DeMille

(57) ABSTRACT

The present disclosure describes a fastening system for an agricultural system. The fastening system includes a first mounting plate coupled to a first component of the agricultural system and a second mounting plate coupled to a second component of the agricultural system, in which the second mounting plate is configured to be aligned with the first mounting plate. The fastening system also includes a coupling assembly coupled to the first mounting plate by at least one retaining fastener, in which the coupling assembly comprises two clamping plates configured to move from a first position that facilitates alignment of the first and second mounting plates to a second position that at least partially sandwiches the first and second mounting plates between the two clamping plates of the coupling assembly. The at least one retaining fastener extends through the two clamping plates of the coupling assembly. At least one alignment fastener also extends through the two clamping plates and is configured to be selectively tightened while the coupling assembly is in the second position to establish a compressive force that drives the two clamping plates to couple the aligned first and second mounting plates to one another.

18 Claims, 6 Drawing Sheets

(56) References Cited

U.S. PATENT DOCUMENTS

| | | |
|---|---|---|
| 6,925,735 B2 | 8/2005 | Hamm et al. |
| 6,988,560 B2 | 1/2006 | Bay |
| 7,624,835 B2 | 12/2009 | Bowers |
| 7,954,262 B2 | 6/2011 | Bernier |
| 7,971,919 B2 | 7/2011 | Vertanen |
| 8,414,052 B2 | 4/2013 | Vertanen |
| 8,511,929 B2 * | 8/2013 | Raye .................... B60T 7/20 248/220.22 |

* cited by examiner

SELF-CONTAINED FASTENING ASSEMBLY FOR AGRICULTURAL SYSTEM

BACKGROUND

The present disclosure generally relates to fastening assemblies for agricultural systems, and more particularly, to a fastening assembly for coupling multiple components of an agricultural system to one another.

Generally, agricultural implements or vehicles (e.g., applicators) are configured to distribute seeds or other agriculturally beneficial material (e.g., fertilizer, pesticides, etc.) across a field of crops (e.g., sugarcane, wheat, pumpkin, maize, cotton, etc.). Some agricultural vehicles may include a chassis coupled to two or more wheels and a propulsion system, such that the agricultural vehicle may travel across areas of the field. Further, agricultural vehicles may include a skid (e.g., a bed) configured to be coupled to the chassis, in which the skid may include or carry a tank configured to store seeds or other agriculturally beneficial material and one or more booms configured to distribute the seeds or other agriculturally beneficial material across the field.

In some agricultural vehicles, the skid may be selectively detached from the chassis for maintenance of the skid or the chassis, for replacing the skid with a new or previously unattached skid, or for replacing all or some of the components of the skid or chassis. Unfortunately, traditional fastening systems for coupling the skid to the chassis may include loose parts (e.g., loose nuts, loose washers, loose bolts) and may include complicated and lengthy fastening/unfastening processes. Thus, traditional fastening systems may be susceptible to lost parts and may result in routine processes taking much more time than expected.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a fastening system for an agricultural system includes a first mounting plate coupled to a first component of the agricultural system and a second mounting plate coupled to a second component of the agricultural system, in which the second mounting plate is configured to be aligned with the first mounting plate. The fastening system also includes a coupling assembly coupled to the first mounting plate by at least one retaining fastener, in which the coupling assembly includes two clamping plates configured to move from a first position that facilitates alignment of the first and second mounting plates to a second position that at least partially sandwiches the first and second mounting plates between the two clamping plates of the coupling assembly. The at least one retaining fastener extends through the two clamping plates of the coupling assembly. At least one alignment fastener also extends through the two clamping plates and is configured to be selectively tightened while the coupling assembly is in the second position to establish a compressive force that drives the two clamping plates to couple the aligned first and second mounting plates to one another.

In a second embodiment, a fastening system for an agricultural system includes a first extension coupled to a first component of the agricultural system, in which the first extension includes two close-ended slots, and a second extension coupled to a second component of the agricultural system, in which the second extension is configured to be aligned with the first extension. The fastening system also includes a coupling assembly having two clamping plates coupled to the first extension by two retaining fasteners extending through respective openings in the two clamping plates and through the two close-ended slots of the first extension. The coupling assembly, via the two retaining fasteners extending within the two close-ended slots, is configured to move linearly along the first extension from a first position configured to facilitate alignment of the first and second extensions to a second position that at least partially sandwiches the first and second extensions between the two clamping plates of the coupling assembly, in which the two retaining fasteners are configured to be selectively tightened while the coupling assembly is in the second position to establish a compressive force that drives the two clamping plates to couple the first and second extensions to one another.

In a third embodiment, a fastening system for an agricultural system includes a first extension coupled to a first component of the agricultural system and a second extension coupled to a second component of the agricultural system, in which the second extension is configured to be aligned with the first extension. The fastening system also includes a coupling assembly having two clamping plates coupled to the first extension by a retaining fastener extending through respective retaining openings in the two clamping plates and in the first extension. The fastening system also includes at least one alignment fastener extending through respective alignment openings in the two clamping plates, in which the coupling assembly is configured to rotate about the retaining fastener from a first position configured to facilitate alignment of the first and second extensions to a second position that at least partially sandwiches the first and second extensions between the two clamping plates of the coupling assembly, the at least one alignment fastener is configured to maintain alignment of the two clamping plates, and the retaining fastener and the at least one alignment fastener are configured to be selectively tightened while the coupling assembly is in the second position to establish a compressive force that drives the two clamping plates to couple the first and second extensions to one another.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
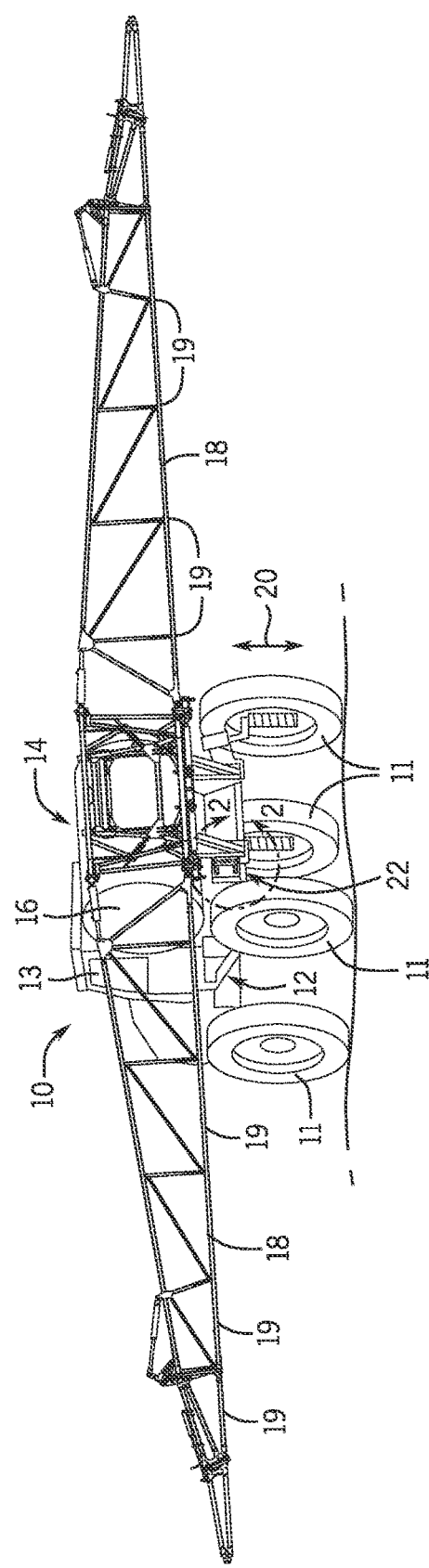
FIG. 1 is a rear perspective view of an embodiment of an agricultural vehicle having a chassis and a bed coupled to the chassis via a self-contained fastening system.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As discussed above, agricultural implements or vehicles (e.g., applicators) are configured to distribute seeds or other agriculturally beneficial material (e.g., fertilizer, pesticides, etc.) across a field of crops (e.g., sugarcane, wheat, pumpkin, maize, cotton, etc.). Agricultural vehicles in accordance with the present disclosure may include a chassis coupled to two or more wheels and a propulsion system, such that the agricultural vehicle may travel across areas of the field. Agricultural vehicles may also include a skid (e.g., a bed) configured to be coupled to the chassis, in which the skid may include a tank configured to store seeds or other agriculturally beneficial material and one or more booms configured to distribute the seeds or other agriculturally beneficial material across the field.

To couple the skid to the chassis, a fastening device (e.g., fastening system, fastening assembly, etc.) may be employed. The fastening device may be selectively fastened to couple or decouple the skid from the chassis, such that the skid, if desired, may be removed from the chassis for maintenance of the tank, the skid, or the chassis, or to replace the tank or skid. In accordance with embodiments of the present disclosure, the fastening device may be a self-contained fastening device which, upon decoupling, does not include any loose parts. In other words, all of the components of the fastening device may remain directly or indirectly coupled to the skid, the chassis, or a combination thereof before, during, and after decoupling and removal of the skid from the chassis. The fastening device may also be a quick release fastening device for reducing a total time of removal of the skid. Because the fastening device is self contained, and because the fastening device is a quick release fastening device, a time for replacing the skid may reduced. For example, the fastening device or fastening system may be decoupled by loosening one or more fasteners of the system, and by sliding or rotating various components of the system away from each other. The fastening device is described in detail below with reference to the figures.

Focusing first on FIG. 1, an embodiment of an agricultural vehicle 10 (e.g., agricultural implement) is illustrated in a rear perspective view. In the illustrated embodiment, the agricultural vehicle 10 includes four wheels 11 and an engine, such that the agricultural vehicle 10 may travel across areas of a field. In some embodiments, the agricultural vehicle 10 may include more or fewer than four wheels 11, e.g., the agricultural vehicle 10 may include two wheels 11.

The agricultural vehicle 10 in the illustrated embodiment includes a chassis 12 coupled to the four wheels 11. The chassis 12 includes a number of components, namely, a cab 13 configured to house an operator for operating the vehicle 10. The chassis 12 is configured to hold and structurally support other components of the agricultural vehicle 10. For example, the chassis 12 is configured to be coupled to a skid 14, in which the skid 14 includes a tank 16 and one or more booms 18. The illustrated vehicle 10 includes two booms 18, which may be folded inwardly for storage and extended outwardly for operation. For example, as illustrated, the booms 18 are extended outwardly and are configured to distribute seed or other agriculturally beneficial material (e.g., fertilizer, pesticides, etc.) across the field. The booms 18 may include a number of product outputs 19 distributed (e.g., evenly distributed) along the booms 18, such that product (e.g., seed, fertilizer, etc.) may be distributed evenly over a large area surrounding the agricultural vehicle 10 as the vehicle 10 moves across the field.

As described above, the skid 14 also includes the tank 16, which may be configured to store seeds or other agriculturally beneficial material, such as fertilizer or pesticides. A seed (or fertilizer, pesticide, etc.) distribution path may be defined between the tank 16 and the outputs 19 of the booms 18. The seed distribution path may be internal to components of the vehicle 10 (e.g., internal to components of the skid 14 and/or chassis 12 of the vehicle 10), and may include a fan or blower configured to convey the seeds or fertilizer from the tank 16, through the distribution path, through the booms 18, and to the outputs 19 located on the booms 18.

In certain embodiments, the tank 16 and other components of the skid 14 may be elevated off the ground a distance 20. For example, the illustrated vehicle 10 is a high clearance agricultural vehicle 10. The skid 14 is positioned on top of the chassis 12 and is coupled to the chassis 12. The skid 14 may be selectively detached (e.g., uncoupled) and removed from the chassis 12 for maintenance or replacement of the skid 14 or for maintenance of the chassis 12. Due to the height of the tank while mounted on the vehicle 10, the skid 14 may be more readily maneuvered/approached for maintenance once removed from the chassis 12 of the vehicle 10. Thus, in accordance with present embodiments, a self-contained fastening system 22 (e.g., coupling system, coupling device, fastening device, etc.) is employed for selectively coupling the skid 14 to the chassis 12. The self-contained fastening system 22 may include a number of components coupled to the skid 14, the chassis 12, or both. Before, during, and after removal of the skid 14 from the chassis 12 (e.g., upon disengaging of the self-contained fastening system 22), all components of the self-contained fastening system 22 remain directly or indirectly attached to the skid 14, the chassis 12, or both. In other words, the self-contained fastening system 22 does not include any components that are separated from both the skid 14 and the chassis 12 to facilitate separation of the skid 14 from the chassis 12. Because each component of the fastening system 22 remains coupled to the skid 14 or chassis 12 even during and after decoupling of the skid 14 from the chassis 12, a total removal time (or replacement time) for removing (or replacing) the skid 14 from the chassis 12 may be reduced, as compared to fastening systems having removable fasteners, which may be dropped or otherwise lost during the fastening/unfastening process. As a result, a total maintenance time of the vehicle 10, particularly of the skid 14, may be reduced, and susceptibility of losing components of the fastening system 22 may also be reduced. The fastening system 22 will be described in detail with reference to later figures.

Figure 2:
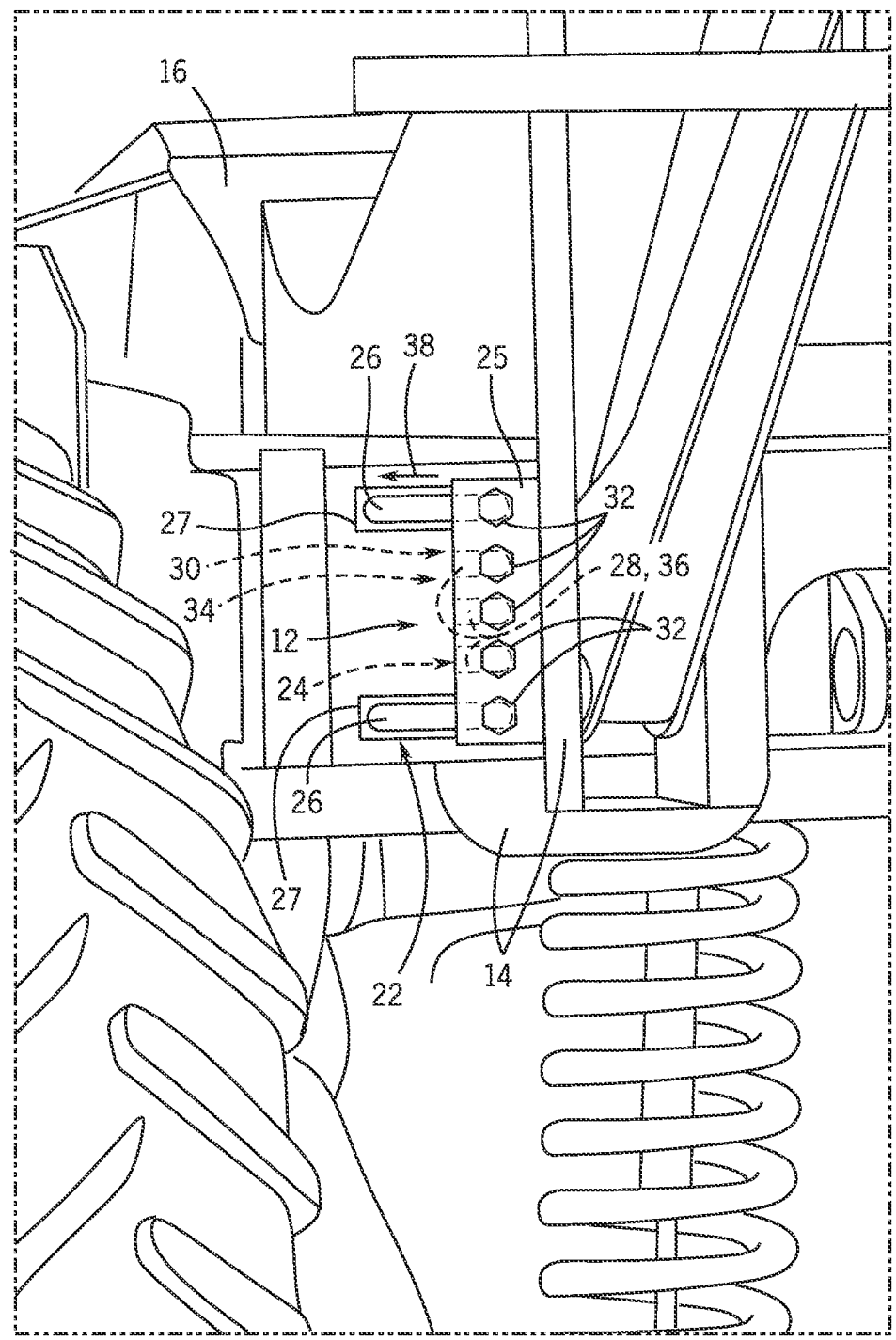
FIG. 2 is a rear perspective view of an embodiment of a self-contained fastening system coupled to a rear of the agricultural vehicle of FIG. 1, taken within line 2-2.
Figure 2:
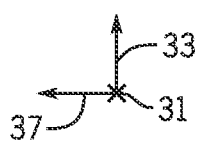
Figure 3:
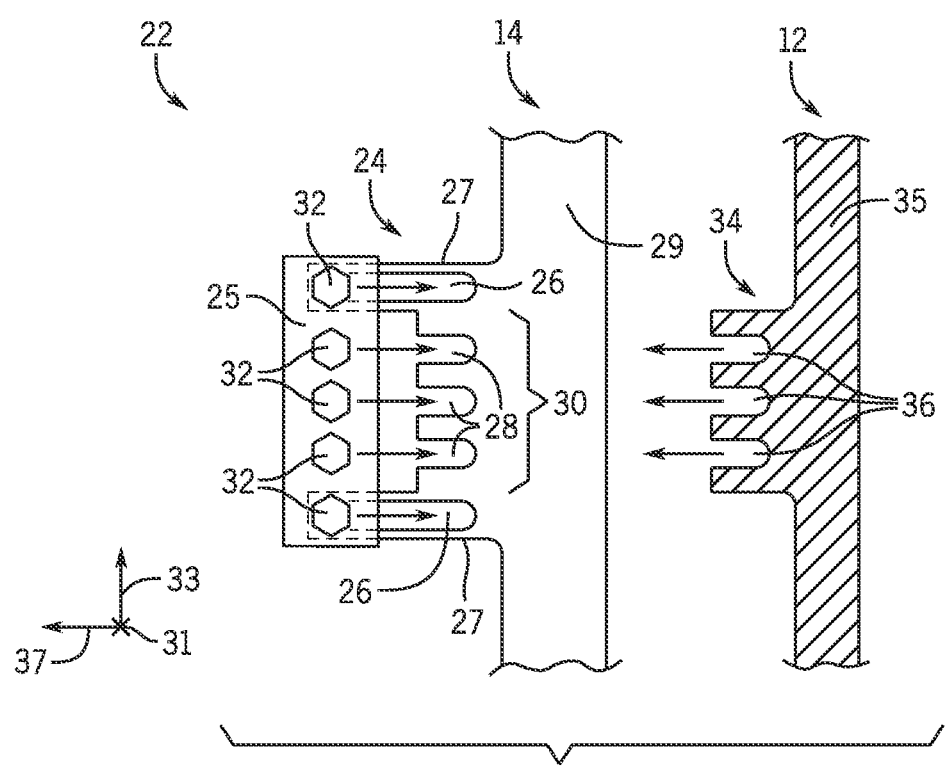
FIG. 3 is a rear view of an embodiment of a self-contained fastening system, which may be used on the agricultural vehicle of FIG. 1.

Turning now to FIGS. 2 and 3, an embodiment of the fastening system 22 (e.g., self-contained fastening system) is shown. FIG. 2 is a rear perspective view of the fastening system 22 (on a rear of the vehicle 10) in a coupled state, i.e., with the skid 14 coupled to the chassis 12 via the fastening system 22. FIG. 3 is a rear view of the fastening system 22 in an uncoupled state (e.g., decoupled state, open state, decoupled position, open position, uncoupled position, etc.), i.e., with the skid 14 uncoupled from the chassis 12. It should be noted that certain components of the fastening system 22 may be more readily observed in FIG. 3 than in FIG. 2, as the fastening system 22 is shown in the decoupled state in FIG. 3 such that certain components of the fastening system 22 are not hidden by certain other components of the fastening system 22.

In the illustrated embodiments, the skid 14 and the chassis 12 each include components of the self-contained fastening system 22. For example, focusing on FIG. 3, the self-contained fastening system 22 includes a skid extension 24 (e.g., a mounting plate, an extension, etc.) sandwiched between two clamping plates 25. The skid extension 24 may be an extension coupled to the skid 14 or extending from a face, edge, or surface of the skid 14 as an integral part. For example, in FIG. 3, the skid extension 24 is welded to a component 29 of the skid 14. Alternatively, the skid extension 24 may be coupled to the component 29 of the skid 14 by some other coupling means (e.g., adhesive, fasteners, etc.). The skid extension 24 includes two close-ended slots 26 extending along two arms 27 of the skid extension 24, and three open-ended slots 28 (e.g., open on one end) in a body 30 of the skid extension 24. As illustrated, the body 30 of the skid extension 24 extends between the two arms 27 of the skid extension 24, in direction 33, although, in another embodiment, the close-ended slots 28 may be disposed on arms 27 that extend from a middle of the skid extension 24 and the open-ended slots 28 may be disposed outside of the close-ended slots 28. In the illustrated embodiment, the skid extension 24 is disposed between (e.g., "sandwiched" between) the two clamping plates 25, such that the two clamping plates 25 (e.g., a "top" clamping plate and a "bottom" clamping plate) are disposed on either side of the skid extension 24. The clamping plates 25 are components of what may be referred to as a coupling assembly, which may also include fasteners, as set forth below.

In the illustrated embodiment, each plate 25 includes five evenly spaced and aligned holes, such that five evenly spaced bolts 32 (e.g., fasteners) may extend through the five evenly spaced and aligned holes of the top and bottom clamping plates 25. In another embodiment, each plate 25 may have more or fewer holes with more or fewer bolts 32, respectively, and the holes and corresponding bolts 32 may or may not be evenly spaced. The illustrated embodiment is intended to exemplify one possible arrangement for the fastening system 22, but other arrangements having a different number of bolts 32 spaced in a different manner would not differ from the scope of the present disclosure. Further, the clamping plates 25 and the bolts 32 may together be considered one component of the fastening system 22 and may be referred to herein as a "single component" or as multiple smaller components making up a single larger component.

In the illustrated embodiments in FIGS. 2 and 3, the two outermost bolts 32 (e.g., retaining fasteners) extend through the aligned through holes of the two clamping plates 25 and through the closed ended slots 26 in the arms 27 of the skid extension 24, which is sandwiched (e.g., disposed) between the clamping plates 25. Thus, the clamping plates 25 are secured to (e.g., retained by) the skid extension 24 via the bolts 32, which extend through the close-ended slots 26. The bolts 32 include retaining features (e.g., locknuts, pins, wingnuts, heads, nuts, etc.) on ends (e.g., bottom sides) of the bolts 32 under the clamping plates 25 (e.g., under the bottom clamping plate 25) in the illustrated view (i.e., in direction 31). The three innermost bolts 32 (e.g., alignment or tightening fasteners) extend not only through the holes of the two clamping plates 25, but may also extend through the three open-ended slots 28 of the skid extension 24 by sliding the clamping plates 25 toward the open-ended slots 28, opposite the direction 37.

To secure the skid 14 to the chassis 12, the skid 14 is moved to align the body 30 of the skid extension 24 with a chassis extension 34 (e.g., a mounting plate, an extension, etc.). The clamping plates 25 are then slid opposite direction 37 until the aligned skid extension 24 and chassis extension 34 are sandwiched between the clamping plates 25. The bolts 32 are then tightened (e.g., via locknuts, pins, or other coupling means) such that the clamping plates 25 press the skid extension 24 and the chassis extension 34 together. It should be noted, however, that in some embodiments, not all of the bolts 32 are tightened. For example, in the illustrated embodiment in FIGS. 2 and 3, five bolts 32 are shown. Of the five bolts 32, the two outer bolts 32, depending on the embodiment, may or may not be tightened. The two outer bolts 32 may, for example, serve only to retain the clamping plates 25 with the skid extension 24 via the two outer bolts 32 extending through the close-ended slots 26 of the skid extension 24. The three inner bolts 32, then, may be tightened such that the clamping plates 25 press the skid extension 24 and the chassis extension 34 together. In such embodiments, the two outer bolts 32 may be pins, step bolts, or some other fastener. In some embodiments, however, the two outer bolts 32 may also be tightened to exert at least a portion of the force to press the skid extension 24 and the chassis extension 34 together.

The chassis extension 34 is not visible in FIG. 2 because it is disposed below the illustrated clamping plate 25 (e.g., proximate to the skid extension 24) and does not include arms corresponding to the skid extension's arms 27. However, the chassis extension 34 is visible in FIG. 3 because it is separated from the skid extension 24. In other words, FIG. 3 shows the fastening system 22 in an open position (e.g., first position) configured to facilitate alignment of the skid extension 24 and the chassis extension 34. Alternatively, FIG. 2 shows the fastening system 22 in a closed position (e.g., second position) configured to enable coupling of the skid 14 and the chassis 12 by engaging the fastening system 22, as set forth in detail below.

In the illustrated embodiments in FIGS. 2 and 3, the chassis extension 34 may be coupled to the chassis 12 or may extend from a face, surface, or edge of the chassis 12 as an integral part. For example, in FIG. 3, the chassis extension 34 is welded to a component 35 of the chassis 12. Alternatively, the chassis extension 34 may be coupled to the component 35 of the chassis 12 by some other coupling system (e.g., adhesive, fasteners, as a feature of a fabricated part, etc.). The chassis extension 34 includes three open-ended slots 36 corresponding to the three open-ended slots 28 of the skid extension 24. The skid extension open-ended slots 28 are configured to align with the chassis extension open-ended slots 36 when the skid extension 24 is aligned with the body 30 of the chassis extension 34, such that the three innermost bolts 32, after moving the clamping plates 25 toward the aligned skid extension 24 and chassis extension 34, extend into the chassis extension open-ended slots 36 and the skid extension open-ended slots 28. In other words, the chassis extension 34 may align with, and have similar geometry as, the body 30 of the skid extension 24. To secure the skid 14 to the chassis 12, the five bolts 32 (or the three innermost bolts 32 of the five bolts 32, as previously described) may be tightened to induce the clamping plates 25 to exert a compressive force on the skid extension 24 and the chassis extension 34, which are disposed on top of one another (e.g., aligned with one another) and sandwiched (e.g., disposed) between the top and bottom clamping plates 25. For example, the fastening system 22 is shown in the coupled state (e.g., closed state, closed position, coupled position) in FIG. 2.

It should be noted that the compressive force exerted by the bolts 32, in the illustrated embodiment, may sandwich the fastening system 22 together in the coupled state, but that other forces that arise from the coupled state of the fastening system 22 may also benefit coupling of the skid 14 to the chassis 12. For example, the fastening system 22, depending on the embodiment, may be oriented with respect to the skid 14 and the chassis 12 in any direction. Accordingly, the fastening system 22 may be oriented such that the bolts 32, disposed within the open-ended slots 28, 36, contact sides of the open-ended slots 28, 36 as the skid 14 moves to block the chassis extension 34 and the skid extension 24 from separating. For example, in FIG. 2, if the skid 14 moves (e.g., bounces) upwardly or downwardly as the vehicle 10 moves over a field, the bolts 32 will contact sides of the open-ended slots 28, 36 and block the skid extension 24 and, thus, the skid 14, from separating away from the chassis extension 34. The fastening system 22 may be oriented on the skid 14 and the chassis 12 to anticipate motion of the skid 14 such that the bolts 32 in any particular direction. For example, in another embodiment, the fastening system 22 may be oriented to block left to right and right to left movement of the skid 14, as opposed to upwards and downwards. Thus, the coupled state of the fastening system 22 may block longitudinal movement of the skid extension 24 (via the bolts 32) as well as upward movement of the skid extension 24 (via the compressive force).

To remove the skid 14 from the chassis 12, the fastening system 22 is disengaged by loosening the bolts 32. For example, each bolt 32 may include a head on one end and a nut on an opposing end. The nuts may be selectively loosened to disengage the fastening system 22 (See FIG. 4). Upon loosening of the bolts 32, the clamping plates 25 slide away from the chassis extension 34 and the body 30 of the skid extension 24. For example, the bolts 32 may be loosened such that the clamping plates 25 slide in the direction 37. The clamping plates 25 are retained by the skid extension 24 via the two outermost bolts 32 extending through the close-ended slots 26 of skid extension 24. The fastening system 22 is illustrated in the decoupled state in FIG. 3, in which the skid 14 may be removed from the chassis 12. However, even in the decoupled state, the skid extension 24, along with the two clamping plates 25 coupled to the skid extension 24 via the two outermost bolts 32 extending through the close-ended slots 26 of the arms 27 of the skid extension 24, remain coupled to the component 29 of the skid 14. By having all components of the fastening system 22 remain coupled to either the skid 14, the chassis 12, or a combination of both, susceptibility of losing components of the self-contained fastening system 22 is reduced or negated. Further, the aforementioned feature may also reduce complexity of removing the skid 14 from the chassis 12, which may reduce a total time for maintenance of the skid 14 and/or chassis 12 or replacement of the skid 14.

In some embodiments, the clamping plates 25 and extension 24 may be coupled to elements of the chassis 12 and the extension 34 may be coupled to elements of the skid 14. For ease of explanation, the extension 24 in the present disclosure is generally referred to as the "skid" extension 24 and the extension 34 is referred to as the "chassis" extension 34, and the corresponding discussion describes the extension 24 having the arms 27 and being coupled to the skid 14 and the extension 34 being coupled to the chassis 12. This description is merely meant to differentiate between the extension 24 and the extension 34 for ease of discussion, and is meant as a non-limiting example. For example, it should be appreciated that either extension 24 (e.g., having arms 27) or extension 34 may be coupled to or integrally formed with either the skid 14 or the chassis 12, so long as one is coupled to or an element of the skid 14 and the other is coupled to or an element of the chassis 12. In either configuration, the self-contained fastening device 22 is readily engaged/disengaged and is not susceptible to lost parts, as all parts are contained on the skid 14 or chassis 12, or a combination thereof, before, during, and after coupling of the skid 14 to the chassis 12 via the fastening system 22.

Figure 4:
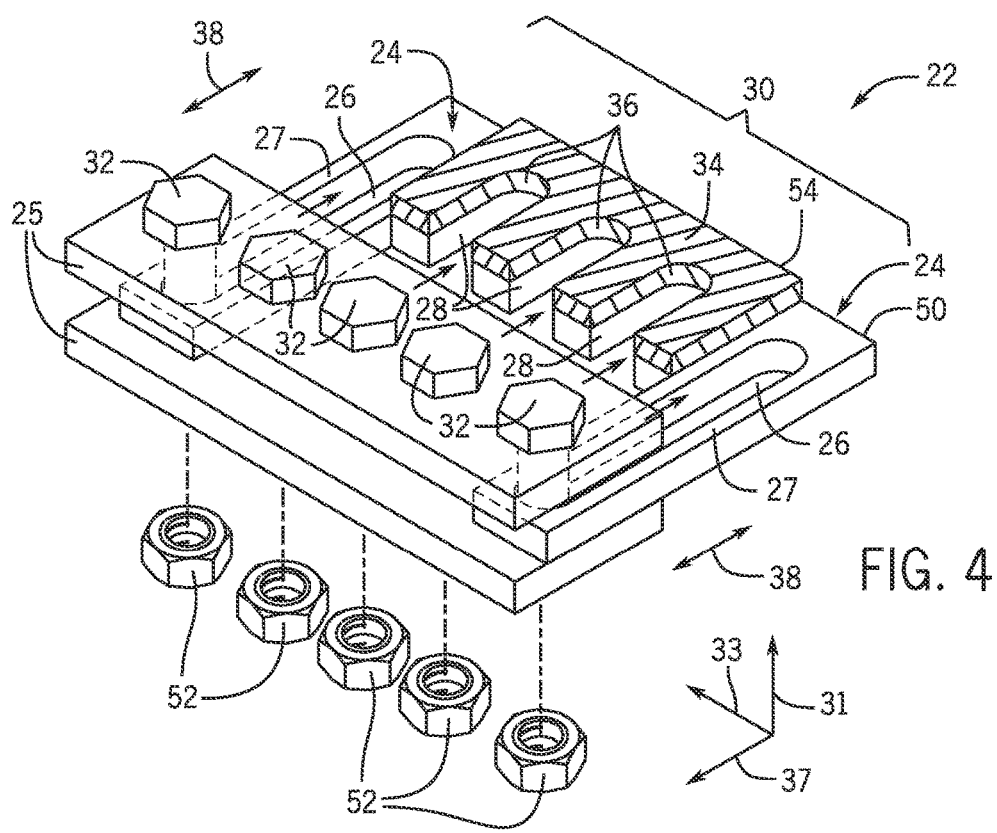
FIG. 4 is a partially exploded perspective view of the self-contained fastening system of FIG. 3.

Turning now to FIG. 4, a perspective view of the self-contained fastening system 22 of FIG. 3 is shown. The fastening system 22 is shown in the decoupled state, but with the skid extension 24 in position (e.g., over the chassis extension 34) to be coupled to the chassis extension 34.

As previously described, the fastening system 22 includes the skid extension 24 with the body 30 extending between the two arms 27 in the direction 33. The skid extension 24 may be coupled to the skid 14 (not shown) at a back face 50 of the skid extension 24 via welding, adhesive, bonding, fastening, or some other mechanism. However, the skid extension 24 may be coupled to the skid 14 along any face, edge, or surface of the skid extension 24. Although the skid 14 is not shown in the illustrated embodiment, it should be appreciated that the illustrated skid extension 24 extends from the skid 14 (or a component thereof) and may be an integral part of the skid 14 (or component thereof). In addition, the skid 14 may be coupled to a face or edge of the skid extension 24 other than the back face 50. Indeed, the skid 14 may be coupled to the clamping plates 25 instead of the skid extension 24. In such a configuration, the clamping plates 25 are coupled to the skid extension 24 via the outermost bolts 32. Thus, the clamping plates 25 remain stationary with respect to the skid 14, and the skid extension 24 is slidable back and forth (as indicated by arrow 38) about the bolts 32.

In the illustrated embodiment, the clamping plates 25 are retained by the skid extension 24 via the two outermost bolts 32 extending through the holes of the clamping plates 25 and the close-ended slots 26 of the arms 27 of the skid extension 24. The bolts 32 may be loosened such that the clamping plates 25 may be selectively moved in the direction 37, as indicated by arrow 38. In order to loosen or tighten the bolts 32 (e.g., the two outermost bolts 32 and/or the three inner most bolts 32), locknuts 52 may be "screwed" or tightened about threaded portions of the bolts 32. In some embodiments, the bolts 32 may include other tightening means. For example, in some embodiments, each bolt 32 may include a wingnut proximate an end of the bolt 32. The bolt 32 may also include a pin configured to be disposed cross-wise through the bolt 32 and underneath the nut, such that the pin retains the nut on the end of the bolt 32.

Disposed above (and aligned with) the skid extension 24 is the chassis extension 34. The chassis extension 34 may be coupled to the chassis 12 (not shown) at a back face 54 of the chassis extension 34 via welding, adhesive, bonding, fastening, or some other mechanism, as previously described. Although the chassis 12 is not shown in the illustrated embodiment, it should be understood that the chassis extension 34 is coupled to the chassis 12 and, in some embodiments, may be an integral part of the chassis 12. In certain embodiments, the chassis 12 may be coupled to a different face or edge of the chassis extension 34 than the back face 54.

To secure the skid 14 to the chassis 12 (e.g., to facilitate compression of the skid extension 24 and the chassis extension 34 between the two clamping plates 25), the body 30 of the skid extension 24 is aligned with the chassis extension 34 such that the chassis extension open-ended slots 36 are aligned with the skid extension open-ended slots 28. The clamping plates 25 slide toward the chassis extension 34 and the body 30 of the skid extension 24 such that the three innermost bolts 32 enter the open-ended slots 36, 28. The locknuts 52 (or other tightening means) are then tightened on each of the five bolts 32 (or the three innermost bolts 32 of the five bolts 32, as previous described) such that a compressive force is exerted on the clamping plates 25 by the five bolts 32 (or three innermost bolts 32), thereby driving the body 30 of the skid extension 24 against the chassis extension 34, which are each sandwiched between the clamping plates 25. As a result, the skid 14 is coupled to the chassis 12. Such a position of the clamping plates 25 may be referred to as a clamped position (e.g., closed position, compressed position, secured position, coupled position, etc.)

To remove the skid 14 from the chassis 12 (e.g., to disengage the self-contained fastening system 22), the locknuts 52 may be loosened to reduce the compressive force on the clamping plates 25 and, thus, on the body 30 of the skid extension 24 and the chassis extension 34. The clamping plates 25 may then be moved along the direction 37, as indicated by arrow 38, to an unclamped position (e.g., open position, decoupled position, uncoupled position, unsecured position, removal position, etc.). The skid 14, along with the skid extension 24 and the clamping plates 25, which are secured to the skid extension 24 via the two outermost bolts 32 extending through the closed slots 26, may be moved away from the chassis extension 34 and the chassis 12.

An agricultural system includes a first mounting plate coupled to a first component of the agricultural system and a second mounting plate coupled to a second component of the agricultural system. The agricultural system includes a coupling assembly coupled to the first mounting plate by a retaining fastener. The coupling assembly comprises two clamping plates configured to move from a first position that facilitates alignment of the first and second mounting plates to a second position that at least partially sandwiches the first and second mounting plates between the two clamping plates of the coupling assembly. The retaining fastener extends through the two clamping plates of the coupling assembly. An alignment fastener extends through the two clamping plates and is configured to be tightened while the coupling assembly is in the second position to establish a force that drives the two clamping plates to couple the aligned first and second mounting plates.

Figure 5:
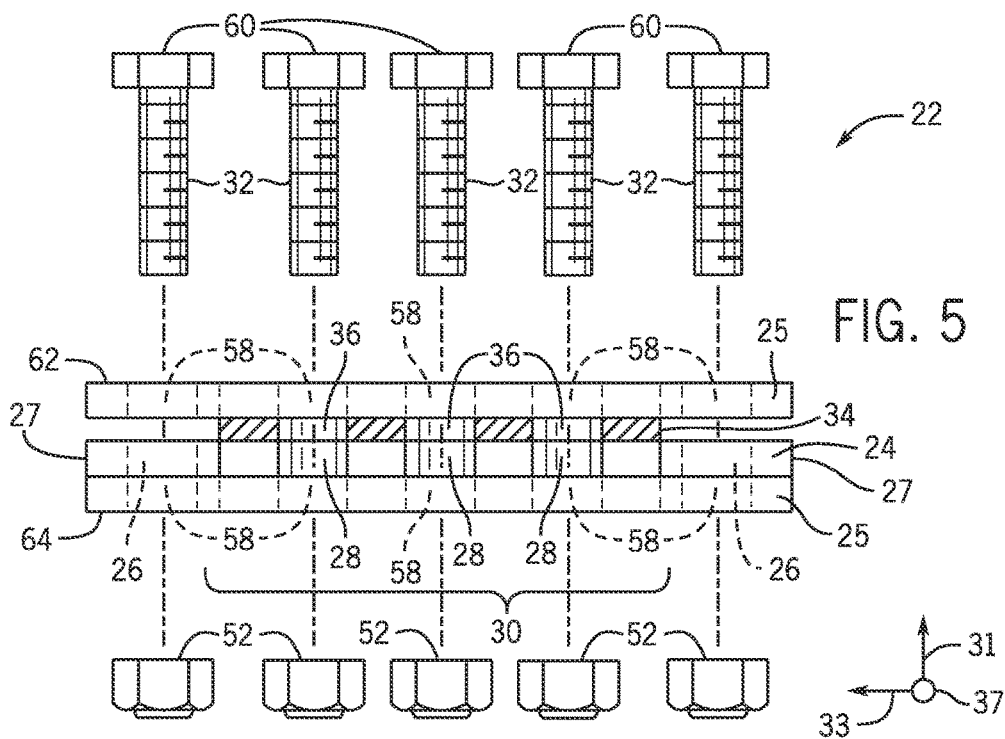
FIG. 5 is a partially exploded side view of the self-contained fastening system of FIG. 3.

Turning now to FIG. 5, a side view of the fastening system 22 of FIG. 3 is shown. As previously described, the bolts 32 are configured to extend through the clamping plates 25 and slots 26 (closed), 28 (open), 36 (open) of the two extensions 24, 34. The two outermost bolts 32 extend through the two outermost holes 58 of the clamping plates 25, as well as through the close-ended slots 26 of the skid extension 24. The three innermost bolts 32 extend through the three innermost holes 58 of the clamping plates 25 and, in the secured position, through the open-ended slots 36 of the skid extension 24 and the open-ended slots 28 of the chassis extension 34. As illustrated, the bolts 32 include heads 60 configured to contact a top surface 62 of the top clamping plate 25 (e.g., uppermost clamping plate 25) while in the closed or secured position. For example, by tightening the locknuts 52 (or other tightening means), the heads 60 of the bolts 32 contact the top surface 62 of the top clamping plate 25 while the locknuts 52 contact a bottom surface 64 of the bottom clamping plate 25. In doing so, a compressive force is exerted against the clamping plates 25, which urges the chassis extension 34 and the skid extension 24 toward one another, thereby securing the skid 14 to the chassis 12.

It should be noted that, as previously described, other forces that arise from the coupled state of the fastening system 22 (other than the compressive force) may further benefit coupling of the skid 14 to the chassis 12. For example, the fastening system 22, depending on the embodiment, may be oriented with respect to the skid 14 and the chassis 12 in any direction. Accordingly, the fastening system 22 may be oriented such that the bolts 32, disposed within the open-ended slots 28, 36, contact sides of the open-ended slots 28, 36 as the skid 14 moves to block the chassis extension 34 and the skid extension 24 from separating. For example, in FIG. 5, once the fastening system 22 is in the coupled state (as in FIG. 2), the bolts 32 may contact sides of the slots 28, 36 to block movement of the skid extension 24 relative to the chassis extension 34 in the direction 33. However, in another embodiment, the fastening system 22 may be oriented such that, in the coupled state, the bolts 32 block movement of the skid extension 24 relative to the chassis extension 34 in a different direction, for example, the direction 37 or the direction 31. Thus, the coupled state of the fastening system 22 may block longitudinal movement of the skid extension 24 (via the bolts 32) as well as upward movement of the skid extension 24 (via the compressive force).

Figure 6:
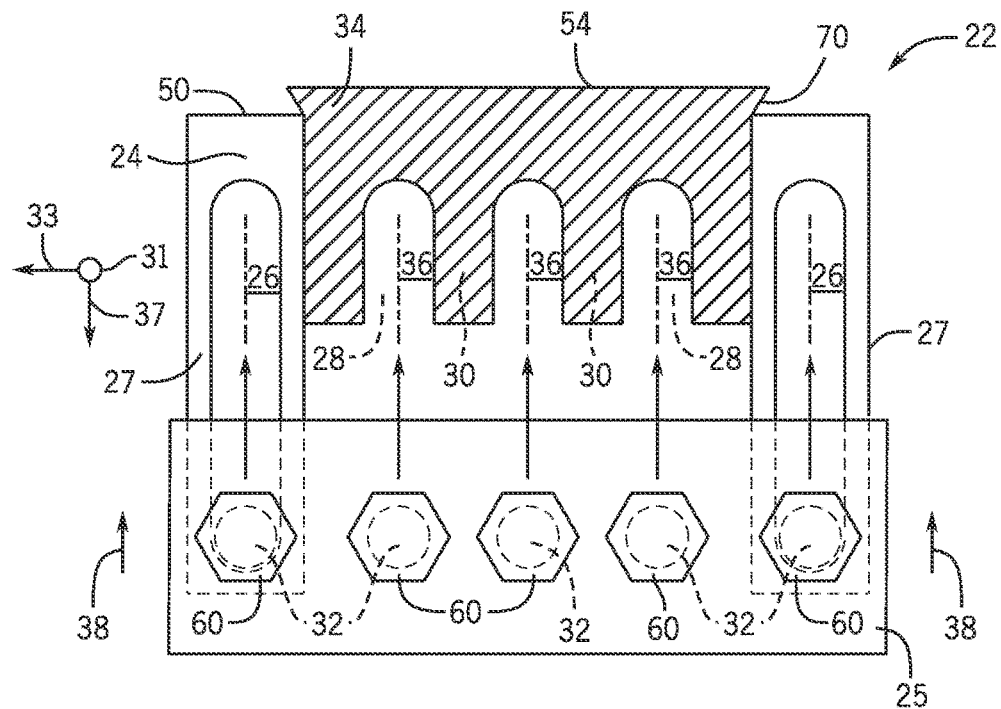
FIG. 6 is a rear view of an embodiment of a self-contained fastening system, which may be used on the agricultural vehicle of FIG. 1.

Turning now to FIG. 6, a rear view of an embodiment of the fastening system 22 is shown. In the illustrated embodiment, the chassis extension 34 includes a flared end 70 which is configured to engage or be coupled to the chassis 12. The flared end 70 may be integral with the chassis 12 or may be coupled to the chassis 12 via a weld, adhesive, bond, or some other fastening mechanism. As illustrated, the fastening system 22 is in the open position, or unsecured position. To secure the chassis 12 to the skid 14, the clamping plates 25 are slid opposite the direction 37 (as indicated by arrow 38) toward the chassis extension 34 and the body 30 of the skid extension 24, which is positioned below the chassis extension 34. In doing so, the three innermost bolts 32 slide into the open-ended slots 36 of the chassis extension 34 and the open-ended slots 28 of the skid extension 24. In addition, the two outermost bolts 32 slide within the close-ended slots 26 toward the back face 50 of the skid extension 24.

Once the skid extension 24 and the chassis extension 34 are disposed substantially between the clamping plates 25, the bolts 32 may be tightened via rotation of the locknuts 52 such that the heads 60 of the bolts 32 and the locknuts 52 exert a compressive force on the clamping plates 25, which urges the skid extension 24 and the chassis extension 34 toward one another, thereby securing the skid 14 to the chassis 12.

Because the skid extension 24 is an element of the skid 14, the chassis extension 34 is an element of the chassis 12, and the clamping plates 25 are coupled to the skid extension 24 via the two outermost bolts 32, all the components of the self-contained fastening system 22 may remain attached to either the skid 14 or the chassis 12, or both, at all times before, during, and after removal of the skid 14 from the chassis 12. In doing so, removal of the skid 14 from the chassis 12 is simplified, a total amount of maintenance time is reduced, and the susceptibility of parts to being lost is reduced.

As previously described, in some embodiments, the extension 34 may be coupled to the skid 14, not the chassis 12, and the extension 24 (and, indirectly, the clamping plates 25 and bolts 32) may be coupled to the chassis 12, not the skid 14. Further, the number of bolts 32 and, thus, the number of slots 26 (closed), 28 (open), 36 (open) may be decreased or increased depending on the embodiment. In any configuration in accordance with the present disclosure, the fastening system 22 simplifies the process of removing the skid 14 from the chassis 12 over embodiments with fastening devices that are not self-contained and are not quickly released (e.g., quickly released by loosening/tightening of the bolts 32 and sliding the clamping plates 25 along the closed slots 26).

Figure 7:
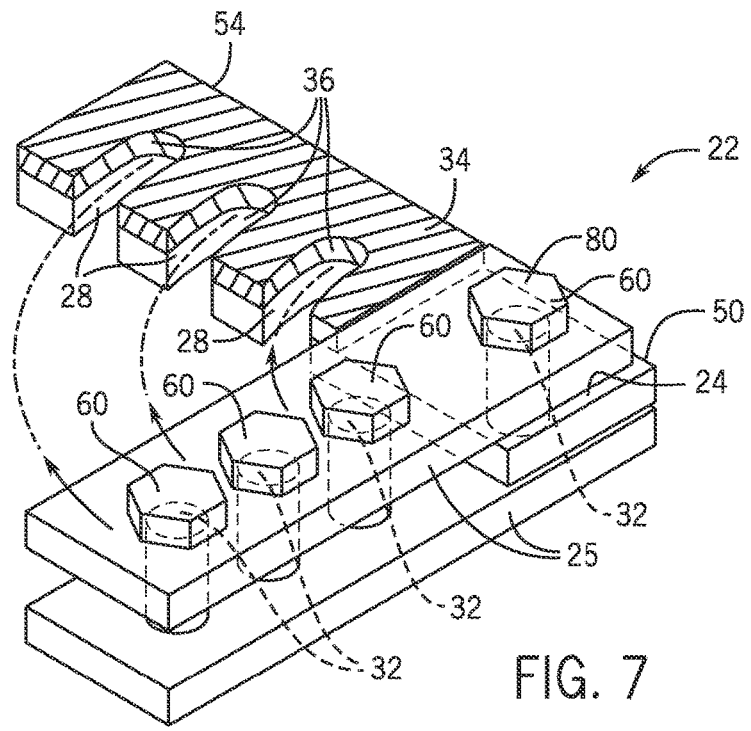
FIG. 7 is a perspective view of an embodiment of a self-contained fastening system, which may be used on the agricultural vehicle of FIG. 1.
Figure 8:
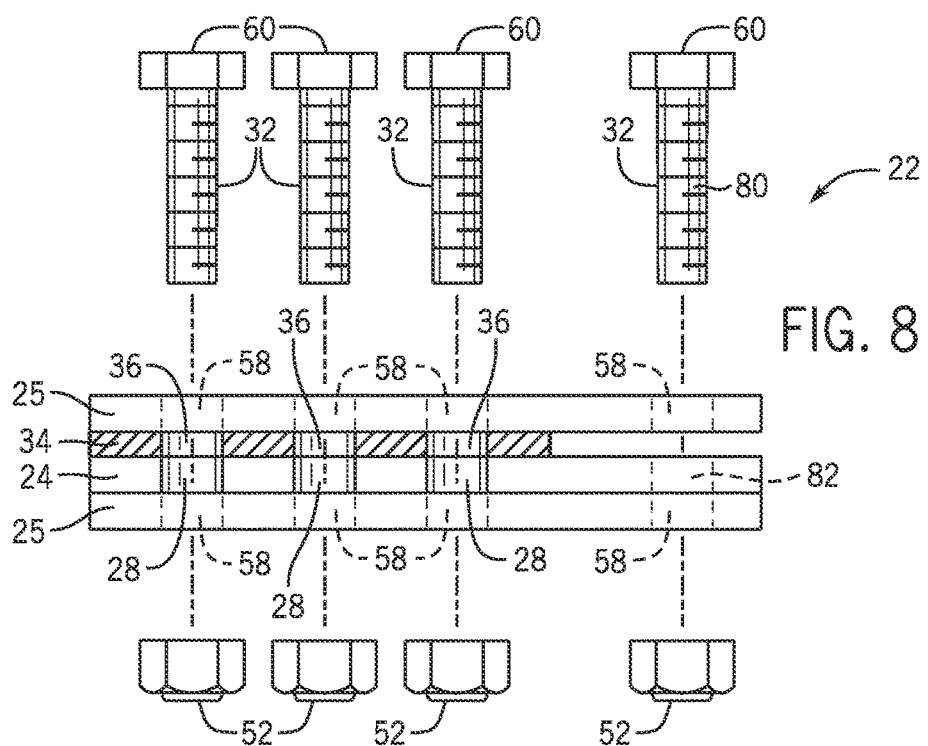
FIG. 8 is a partially exploded side view of the self-contained fastening system of FIG. 7.
Figure 9:
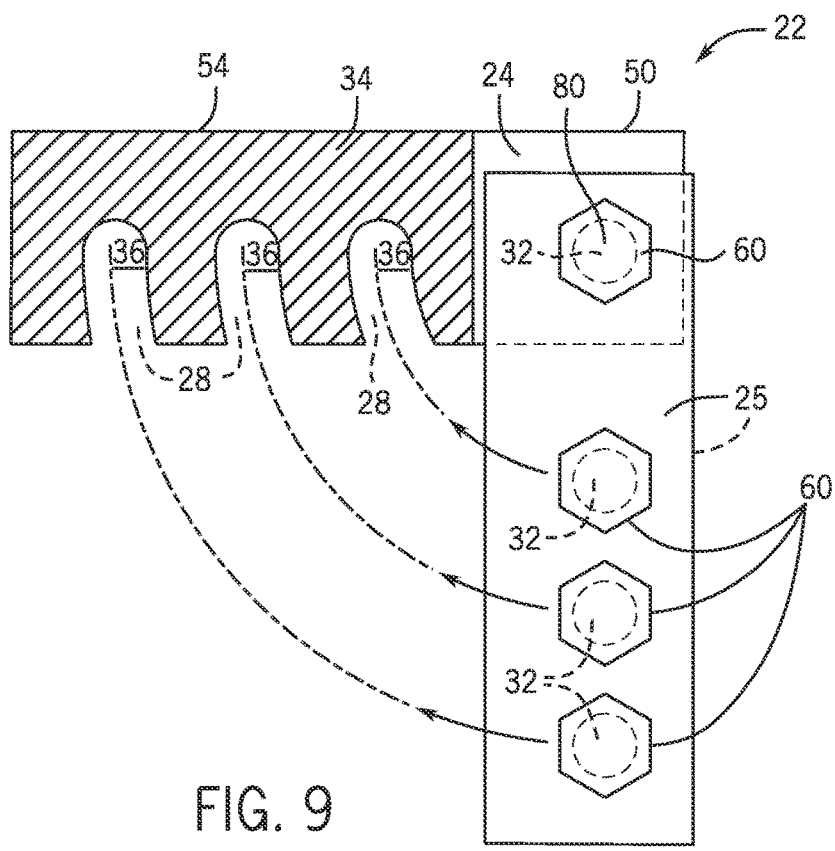
FIG. 9 is a rear view of the self-contained fastening system of FIG. 7.

In FIGS. 7-9, another embodiment of the fastening system 22 is shown. In the illustrated embodiment, the skid extension 24 is configured to slide below the chassis extension 34. In another embodiment, the skid extension 24 may be configured to slide on top of the chassis extension 34. In either configuration, the two clamping plates 25 are coupled to the skid extension 24 via a single bolt 80 extending through the clamping plates 25 and a closed hole 82 of the skid extension, as shown in FIG. 8.

In the embodiments shown in FIGS. 7-9, the clamping plates 25 (e.g., clamping bars) are configured to swivel (e.g., rotate) about the single bolt 80, which is coupled to the skid extension 24 (e.g., by extending through the hole 82 in the skid extension 24). The clamping plates 25 swivel about the single bolt 80 until the extensions 24, 34 are disposed between the clamping plates 25. The bolts 32 (including or not including bolt 80) may then be tightened by rotating the locknuts 52 disposed below the bottom most clamping plate 25. For example, all the bolts 32, including the single bolt 80, may be tightened. Alternatively, the bolts 32, not including the single bolt 80, may be tightened. In either configuration, the locknuts 52 and heads 60 of the bolts 32 (including or not including single bolt 80) exert a compressive force against the clamping plates 52 and, thus, drive the extensions 24, 34 toward one another, as previously described.

Accordingly, the extensions 24, 34, which are elements of, e.g., the skid 14 and the chassis 12, respectively, are pressed together, securing the skid 14 to the chassis 12. For example, the chassis extension 34 is configured to be coupled to the chassis 12 at the back face 54 of the chassis extension 34 (e.g., via welding, adhesive, fastening, bonding, etc.), although the chassis extension 34 may be coupled to the chassis 12 along another face of the chassis extension 34 in a different embodiment. Further, the skid extension 24 is configured to be coupled to the skid 14 at the back face 50 of the skid extension 24 (e.g., via welding, adhesive, bonding, fastening, etc.), although the skid extension 24 may be coupled to the skid 14 along another face of the skid extension 24 in a different embodiment. Thus, by sandwiching the skid extension 24 and the chassis extension 34 together between the clamping plates 25 and tightening the locknuts 52 on the bolts 32, as shown in FIG. 8, the skid 14 may be secured to the chassis 12.

It should be noted that, due to the swiveling (e.g., rotating) action of the clamping plates 25, the open-ended slots 36 of the extension 34 and the open-ended slots 28 of the extension 24 are tapered or curved to accommodate entry of the bolts 32. Thus, the bolts 32 may enter the slots 36, 28 without being blocked by sides of the slots 36, 28. Further, it should be noted that, in some embodiments, more or fewer than three slots 36, 28 for each of the skid extension 24 and the chassis extension 34 may be included. For example, in another embodiment, one, two, four, five, six, or more slots 36, 28 for each of the skid extension 24 and the chassis extension 34 may be included.

Further, in any of the aforementioned embodiments, it should be noted that one of the clamping plates 25 may be directly affixed to either the skid 14 or to the chassis 12, and both clamping plates 25 may be coupled to one of the extensions 24, 34 via one or more of the bolts 32, where the extension 24, 34 to which the clamping plates 25 are coupled (via the bolts 32) is not directly affixed to the skid 14 or chassis 12. Thus, the extension 24, 34 to which the clamping plates 25 are coupled may be movable relative to the clamping plates 25 and the skid 14 or chassis 12 to which the one clamping plate 25 is directly affixed, and may be slid over the opposing extension 34, 24 such that both extensions 24, 34 are disposed between the stationary clamping plates 25. The clamping plates 25 may then be tightened about the extensions 24, 34 in the same manner as previously described, i.e., by tightening the bolts 32 via the locknuts 52. After loosening the bolts 32, the skid 14 may be removed from the chassis 12 for maintenance of the tank 16 or other skid 14 or chassis 12 components. Further, in such an embodiment, all components of the fastening system 22 may be contained on either the skid 14 or chassis 12 of the vehicle 10, or a combination thereof, at all times before, during, and after removal of the skid 14 from the chassis 12, and can readily be used to secure the skid 14 to the chassis 12 or to remove the skid 14 from the chassis 12.

Further still, it should be noted that, in some applications, one clamping plate 25 may be sufficient to contain all the bolts 32 with either the chassis 12 or the skid 14 and to couple the skid 14 to the chassis 12. For example, focusing in particular on FIG. 4, the self-contained fastening system 22 may only include the top clamping plate 25, which is coupled to the skid extension 24 via the outer bolts 32 extending within the close-ended slots 26 of the skid extension 24. The bolts 32 (including or not including the outer bolts 32) may be tightened such that the locknuts 52 contact a bottom surface of the skid extension 24 instead of a bottom surface of a bottom clamping plate 25. It should be noted that the same concept described above (e.g., the self-contained fastening system 22 having only one clamping plate 25) may also apply to the embodiment of the self-contained fastening system 22 shown in FIGS. 7-9.

By utilizing the self-contained fastening system 22 shown in FIGS. 1-9, time to replace the skid 14 and/or maintenance time of the vehicle 10 (in particular, the skid 14 of the vehicle 10) may be reduced. For example, because all parts remain attached to the skid 14 or the chassis 12, or a combination thereof, the parts are not separately stored during maintenance and are readily available for reengaging the skid 14 with the chassis 12. Further, the susceptibility of lost parts is reduced or negated because none of the parts are stored separate from both the skid 14 and chassis 12 during maintenance.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural system, comprising:
    a first mounting plate coupled to a first component of the agricultural system;
    a second mounting plate coupled to a second component of the agricultural system, wherein the second mounting plate is configured to be aligned with the first mounting plate; and
    a coupling assembly coupled to the first mounting plate by at least one retaining fastener, wherein the coupling assembly comprises two clamping plates configured to move, relative to the first mounting plate and the second mounting plate, from a first position that facilitates alignment of the first and second mounting plates to a second position that at least partially positions the first and second mounting plates between the two clamping plates of the coupling assembly, wherein the at least one retaining fastener extends through the two clamping plates of the coupling assembly, and wherein at least one alignment fastener extending through the two clamping plates is configured to be selectively tightened while the coupling assembly is in the second position to establish a compressive force that drives the two clamping plates to couple the aligned first and second mounting plates to one another;
    wherein the first mounting plate comprises a close-ended opening through which a first retaining fastener of the at least one retaining fastener extends to couple the coupling assembly to the first mounting plate, such that the two clamping plates of the coupling assembly are configured to move between the first position and the second position while the first retaining fastener extends within the close-ended opening.

2. The agricultural system of claim 1, wherein the first component comprises a chassis and the second component comprises a skid.

3. The agricultural system of claim 1, wherein the first mounting plate is integrally formed with the first component and the second mounting plate is integrally formed with the second component.

4. The agricultural system of claim 1, wherein the close-ended opening comprises a close-ended slot.

5. The agricultural system of claim 4, wherein the first mounting plate comprises:
    an additional close-ended slot through which a second retaining fastener of the at least one retaining faster extends to couple the coupling assembly to the first mounting plate, such that the two clamping plates are configured to move linearly between the first position and the second position while the second retaining fastener extends within the additional close-ended slot.

6. The agricultural system of claim 1, wherein the first mounting plate comprises at least one first open-ended slot and the second mounting plate comprises at least one second open-ended slot, the at least one first open-ended slot and the at least one second open-ended slot are configured to be aligned with one another while the first mounting plate is aligned with the second mounting plate, and the at least one alignment fastener extending through the two clamping plates is configured to extend into the at least one first open-ended slot and the at least one second open-ended slot while the coupling assembly is in the second position.

7. The agricultural system of claim 6, wherein the at least one alignment fastener comprises:
    a head disposed on a first side of the at least one alignment fastener and configured to contact a top surface of a first clamping plate of the two clamping plates; and
    a tightening feature disposed on a second side of the at least one alignment fastener opposite the first side, wherein the tightening feature is configured to be selectively tightened such that the tightening feature contacts a bottom surface of a second clamping plate of the two clamping plates and the head and the tightening feature, upon tightening, exert a compressive force that drives the two clamping plates to couple the first and second mounting plates to one another.

8. The agricultural system of claim 7, wherein the tightening feature comprises a locknut.

9. An agricultural system, comprising:
    a first extension coupled to a first component of the agricultural system, wherein the first extension comprises two close-ended slots;
    a second extension coupled to a second component of the agricultural system, wherein the second extension is configured to be aligned with the first extension; and
    a coupling assembly comprising two clamping plates coupled to the first extension by two retaining fasteners extending through respective openings in the two clamping plates and through the two close-ended slots of the first extension, wherein the coupling assembly, via the two retaining fasteners extending through the two close-ended slots, is configured to move, relative to the first extension and the second extension, linearly along the first extension from a first position configured to facilitate alignment of the first and second extensions to a second position that at least partially positions the first and second extensions between the two clamping plates of the coupling assembly, and the two retaining fasteners are configured to be selectively tightened while the coupling assembly is in the second position to establish a compressive force that drives the two clamping plates to couple the first and second extensions to one another.

10. The agricultural system of claim 9, wherein the first component comprises a chassis and the second component comprises a skid.

11. The agricultural system of claim 10, wherein the first extension is integrally formed with the first component and the second extension is integrally formed with the second component.

12. The agricultural system of claim 9, wherein the first extension comprises at least one first open-ended slot and the second extension comprises at least one second open-ended slot, the at least one first open-ended slot and the at least one second open-ended slot are configured to be aligned with one another while the first extension is aligned with the second extension, and at least one alignment fastener extending through the two clamping plates is configured to extend into the at least one first open-ended slot and the at least one second open-ended slot while the coupling assembly is in the second position.

13. The agricultural system of claim 12, wherein the two retaining fasteners and the at least one alignment fastener comprise:
respective heads disposed on a first side of the two retaining fasteners and the at least one alignment fastener and configured to contact a top surface of a first clamping plate of the two clamping plates; and
respective tightening features disposed on a second side of the two retaining fasteners and the at least one alignment fastener opposite the first side, wherein the respective tightening features are configured to be selectively tightened such that the respective tightening features contact a bottom surface of a second clamping plate of the two clamping plates and the respective heads and the respective tightening features, upon tightening, exert a compressive force that drives the two clamping plates to couple the first and second extensions to one another.

14. The agricultural system of claim 13, wherein the respective tightening features comprise wingnuts.

15. A fastening system for an agricultural system, wherein the fastening system comprises:
a first extension configured to be coupled to a first component of the agricultural system, wherein the first extension comprises two close-ended slots;
a second extension configured to be coupled to a second component of the agricultural system, wherein the second extension is configured to be aligned with the first extension; and
a coupling assembly comprising two clamping plates coupled to the first extension by two retaining fasteners extending through respective openings in the two clamping plates and through the two close-ended slots of the first extension, wherein the coupling assembly, via the two retaining fasteners extending through the two close-ended slots, is configured to move, relative to the first extension and the second extension, linearly along the first extension from a first position configured to facilitate alignment of the first and second extensions to a second position that at least partially positions the first and second extensions between the two clamping plates of the coupling assembly, and the two retaining fasteners are configured to be selectively tightened while the coupling assembly is in the second position to establish a compressive force that drives the two clamping plates to couple the first and second extensions to one another.

16. The fastening system of claim 15, wherein the first extension comprises at least one first open-ended slot and the second extension comprises at least one second open-ended slot, the at least one first open-ended slot and the at least one second open-ended slot are configured to be aligned with one another while the first extension is aligned with the second extension, and at least one alignment fastener extending through the two clamping plates is configured to extend into the at least one first open-ended slot and the at least one second open-ended slot while the coupling assembly is in the second position.

17. The fastening system of claim 16, wherein the two retaining fasteners and the at least one alignment fastener comprise:
respective heads disposed on a first side of the two retaining fasteners and the at least one alignment fastener and configured to contact a top surface of a first clamping plate of the two clamping plates; and
respective tightening features disposed on a second side of the two retaining fasteners and the at least one alignment fastener opposite the first side, wherein the respective tightening features are configured to be selectively tightened such that the respective tightening features contact a bottom surface of a second clamping plate of the two clamping plates and the respective heads and the respective tightening features, upon tightening, exert a compressive force that drives the two clamping plates to couple the first and second extensions to one another.

18. The fastening system of claim 17, wherein the respective tightening features comprise wingnuts.

* * * * *